(12) United States Patent
Voltz

(10) Patent No.: US 6,859,538 B1
(45) Date of Patent: Feb. 22, 2005

(54) PLUG AND PLAY COMPATIBLE SPEAKERS

(75) Inventor: Christopher Voltz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/271,050

(22) Filed: Mar. 17, 1999

(51) Int. Cl.[7] .............................................. H04B 3/00

(52) U.S. Cl. ........................ 381/77; 700/94; 381/101

(58) Field of Search ........................ 381/77, 101, 120, 381/98; 700/94; 710/8, 9, 10

(56) References Cited

U.S. PATENT DOCUMENTS

| | | | | |
|---|---|---|---|---|
| 5,541,981 A | * | 7/1996 | Lynn | 379/88.25 |
| 5,581,621 A | * | 12/1996 | Koyama et al. | 381/103 |
| 5,881,103 A | * | 3/1999 | Wong et al. | 381/103 |
| 6,385,322 B1 | * | 5/2002 | Mietling | 381/82 |

* cited by examiner

Primary Examiner—Ping Lee (57) ABSTRACT

A speaker includes at least one transducer and at least one memory device. The at least one transducer is adapted to receive an audio signal. The at least one memory device is adapted to store data related to the speaker. A method includes reading data from a memory device of at least one speaker. An audio signal is provided from an audio system.

59 Claims, 6 Drawing Sheets

PLUG AND PLAY COMPATIBLE SPEAKERS

BACKGROUND OF THE INVENTION

1. Field of the Invention

This invention relates generally to a method and apparatus for automatically detecting the type of speaker connected to an audio device and more particularly, to plug and play compatible speakers.

2. Description of the Related Art

The proliferation of audio devices has increased the diversity of speakers available for use in audio applications. Speakers may be manufactured to be compatible with a particular audio system. One example is in a computer where speakers are made to enhance the multimedia capabilities of the computer. Typically with a computer, the audio system is designed to optimize the capabilities of a particular speaker. For example, the audio system equalization may be designed to match the performance parameters (e.g., speaker impedance, frequency response, etc.) of a particular speaker.

Figure 1:
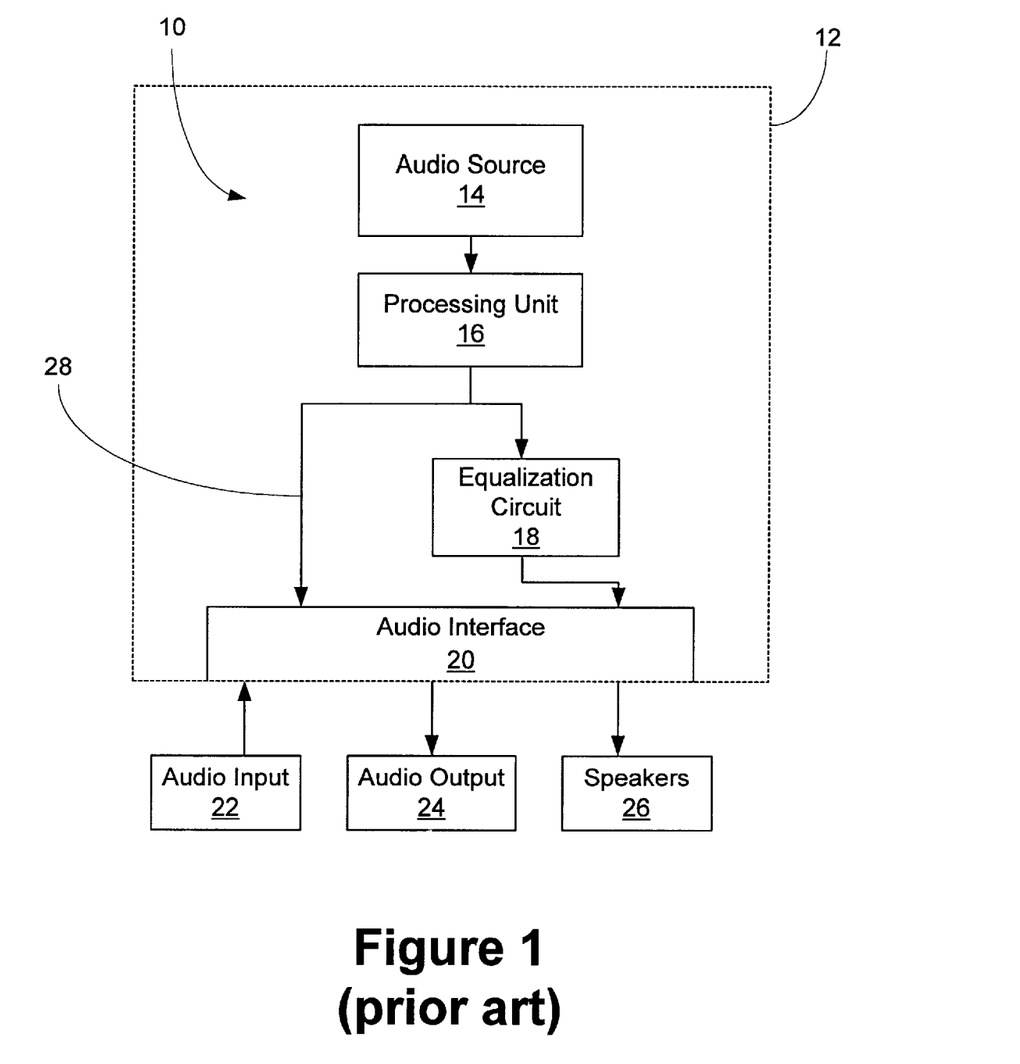
FIG. 1 is a block diagram of a computer audio system including prior art speakers.

FIG. 1 illustrates a block diagram of an audio system 10 utilized in a computer 12. The audio system 10 includes an audio source 14, a processing unit 16, an equalization circuit 18, and an audio interface 20, which interfaces the computer 12 with an audio input 22, an audio output 24, and speakers 26. The audio source 14 may include devices such as a CD-ROM, sound files, or any other source that produces audio data. The data from the audio source 14 is delivered to the processing unit 16 (e.g., ESS 1887, etc.), and the processing unit 16 outputs the data in an analog stereo pair. The processing unit 16 may include processing logic, an A/D converter, a D/A converter, and other components. The equalization circuit 18 receives the analog stereo pair from the processing unit 16 and sends an equalized analog stereo pair to the speakers 26 via the audio interface 20. Additionally, a direct line 28 that bypasses the equalization circuit 18 distributes the analog stereo pair to the audio output 24 (e.g., headphones, lineout, etc.).

The equalization circuit 18 may include various electrical components such as operational amplifiers and filter networks. Typically, the equalization circuit 18 is designed specifically for a particular speaker 26 or set of speaker characteristics. Although speakers (not shown) that are not intended for a given equalization circuit 18 may function in the audio system 10, the sound quality and performance of the audio system 10 may suffer.

For a variety of reasons, the speakers intended for use in the audio system may not be present in the final application. Typically, computer speakers are shipped and sold separately from the computer. Often, the user must select from a wide variety of computer speakers that may not function optimally with the equalization circuit inside the computer. Also, computers are often sold on a configured-to-order (CTO) basis, which may result in the user inadvertently ordering speakers that are not tailored to the equalization circuit of the audio system.

Using a prior art system the user may be unaware that the audio system is not designed for use with the chosen speakers. In addition, the user may be unaware that the sound quality and performance of the audio system has been reduced and may be improved by matching the audio system with the proper speakers. Also, the speakers and the audio system have no way of communicating with one another, which prevents the audio system from notifying the user that a problem may exist or eliminating the problem automatically.

The present invention is directed to overcoming, or at least reducing the effects of, one or more of the problems set forth above.

SUMMARY OF THE INVENTION

In one aspect of the present invention, a speaker is provided. The speaker includes at least one transducer and at least one memory device. The at least one transducer is adapted to receive an audio signal. The at least one memory device is adapted to store data related to the speaker.

In another aspect of the present invention, a method is provided. The method includes reading data from a memory device of at least one speaker. An audio signal is provided from an audio system.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
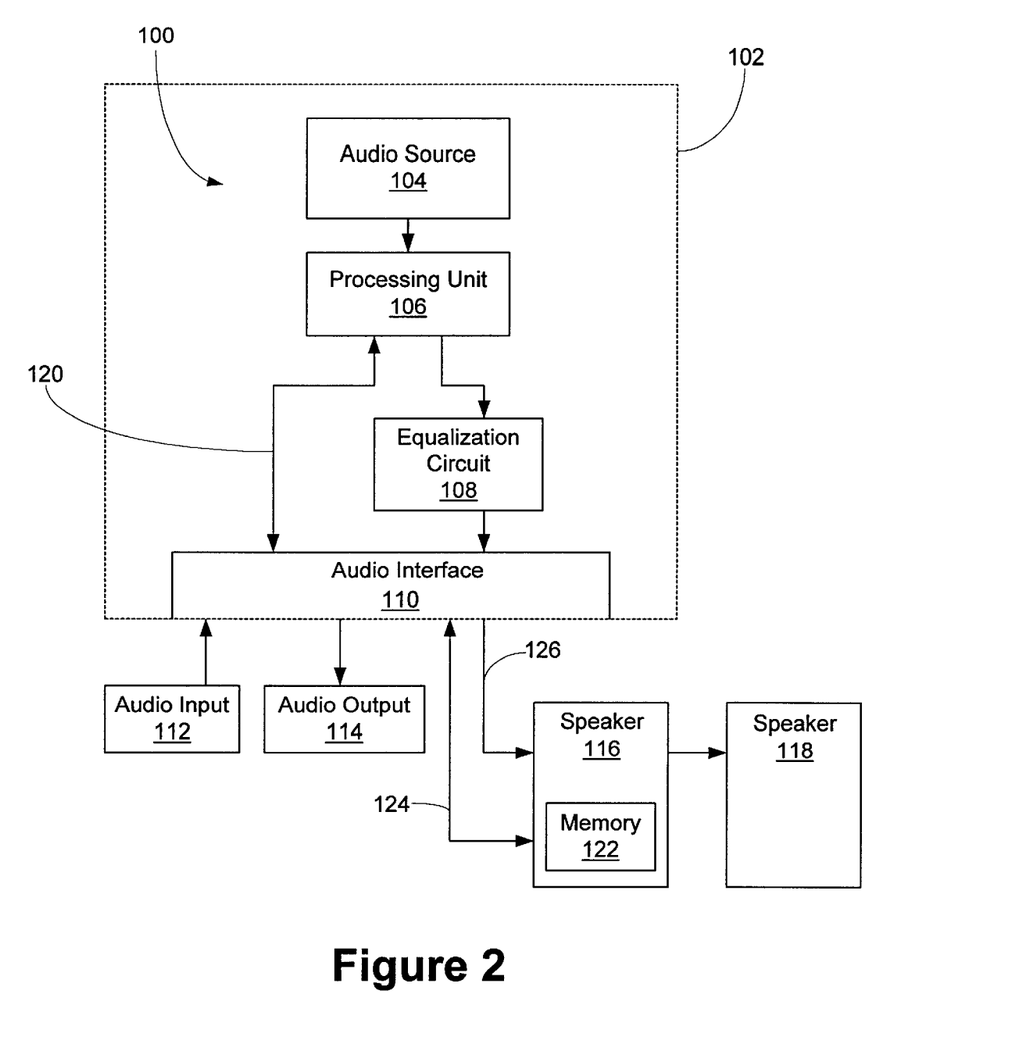
FIG. 2 is a block diagram of a computer audio system illustrating one embodiment of the present invention.

FIG. 2 illustrates a block diagram of an audio system 100, which may be a stereo, VCR, or other such system. In one embodiment, the audio system 100 is a computer 102. The audio system 100 may include an audio source 104, a processing unit 106, an equalization circuit 108, and an audio interface 110, which interfaces the computer 102 with an audio input 112, an audio output 114, and a first and second speaker 116, 118.

The audio source 104 may include devices such as a CD-ROM, sound files, or any other source that produces audio data. The processing unit 106 may receive audio data from the audio source 104 or the audio input 112. Those skilled in the art will appreciate that the processing unit 106 may have many different embodiments depending upon the application and that the processing unit 106 may include processing logic, an A/D signal converter, a D/A signal converter, and other components. In one embodiment, the processing unit 106 is an 1887 chip manufactured by ESS Technology Inc. The processing unit 106 receives audio data, in analog or digital form, for example, and provides an output in the form of an analog stereo pair.

The equalization circuit 108 may include various electrical components such as operational amplifiers and filter networks. The analog stereo pair from the processing unit 106 is provided to the equalization circuit 108 and a modified form of the analog stereo pair is delivered to the first and second speakers 116, 118 via the audio interface 110. Additionally, the analog stereo pair from the processing unit 106 may bypass the equalization circuit 108 and be provided directly to the audio output 114 for use with, for example, headphones, a lineout port, or for other uses. Although two speakers 116, 118 are shown in FIG. 2, those skilled in the art will appreciate that the audio system 100 and the audio interface 110 may be adapted to accommodate any number of speakers 116, 118 including a single speaker.

In FIG. 2, the first speaker 116 is shown with a memory block 122. Although the memory block 122 is only shown for the first speaker 116, it is contemplated that each speaker 116, 118 may contain a separate memory block 122 and that the location, number, and types of memory blocks 122 may be changed depending upon the application. In addition, it is contemplated that the memory block 122 may be any of a number of nonvolatile memory devices such as a ROM, a PROM, an EPROM, an EEPROM, a flash memory device, or other memory element or device. In one embodiment, the memory block 122 is a serial EPROM. The memory block 122 may store information about the attached speakers 116, 118 such as identification, performance parameters, and other information.

It is contemplated that a variety of devices or methods may be utilized to couple the memory block 122 with the audio system 100 and that the particular embodiment chosen will depend on a variety of factors such as cost, the complexity of the audio system 100, and other considerations. For example, the memory block 122 may communicate with the audio system 100 through the audio interface 110, which may be comprised of numerous standard industry buses such as, for example, the Phillips IIC bus, the Dallas Semiconductor 1-Wire bus, industry standard architecture (ISA), etc. Alternatively, it is contemplated that the audio interface 110 may include a wireless communication link. For example, the memory block 122 may communicate with the audio system 100 using infrared (IR), radio frequency (RF), or any other wireless communication protocol.

In one embodiment, the memory block 122 communicates with the audio system 100 using a single wire bus 124. In addition to functioning as a data line, the single wire bus 124 may be used to power the memory block 122. Alternatively, the first speaker 116 may power the memory block 122, provided the first speaker 116 is powered. It is also contemplated that the signal wires 126 of the first speaker 116 (e.g., tip and ring) may be adapted to couple the first speaker 116 and the memory block 122 to the audio interface 110, thus eliminating the need for the additional single wire bus 124.

Those skilled in the art will appreciate that the audio interface 110 may include a single open collector or tristate-able I/O (not shown) connected via the single wire bus 124 to the memory block 122 of the first speaker 116. Alternatively, the audio interface 110 may include two open collector or tristate-able I/Os (not shown) connected via a two wire bus (not shown) to the memory block 122 of the first speaker 116.

In one embodiment, during system initialization, for example, on power-up, the audio system 100 queries the first speaker 116 and reads the data stored in the memory block 122. It is contemplated that the processing unit 106 or a host CPU (not shown) may poll the audio interface 110 to determine if the speakers 116, 118 are coupled to the audio interface 110. Once it is determined the speakers 116, 118 are coupled to the audio interface 110 the data may be read from the memory block 122. Alternatively, an interrupt may be generated when the speakers 116, 118 are coupled to the audio interface 110. The interrupt from the speakers 116, 118 may alert the processing unit 106 or the host CPU (not shown) to read the data stored in the memory block 122.

It is contemplated that the audio system 100 or the host CPU (not shown) may utilize a variety of devices or methods in conjunction with the audio interface 110 to communicate with the memory block 122. For example, the audio system 100 may communicate with the memory block 122 of the first speaker 116 using BIOS, driver, application software (e.g., operating system, etc.), or any other appropriate device or method. Those skilled in the art will appreciate that the hardware and protocol used by the audio system 100 to communicate with the memory block 122 may vary depending upon the application.

In one embodiment, the audio system 100 is coupled to the memory block 122 using the single wire bus 124. The application software may establish communication with the memory block 122 using a handshaking routine. In addition, the application software may requests a block of data from a specified address that identifies the location of the memory block 122 to the audio system 100. The application software may read the data stored in the memory block 122 using a serial communication protocol.

The data located in the memory block 122 may be read by the processing unit 106, and the processing unit 106 may determine whether the speakers 116, 118 are compatible with the audio system 100. It is contemplated that a variety of methods may be used to determine if the attached speakers 116, 118 are compatible with the audio system 100. In one embodiment, the data read from the memory block 122 may include an identification code. The identification code may include various information about the speakers 116, 118 such as, the manufacturer, model number, or any other information that may identify the speakers 116, 118 to the audio system 100. It is contemplated that the identification code may be compared with a list of supported identification codes that are stored in a data file by the computer 102. In this manner, the identification code may be used to identify the speakers 116, 118 to the audio system 100. It is contemplated that the list of identification codes may be pre-installed in the computer 102 (e.g., by the manufacturer of the audio system 100) or may be installed or updated by the user. For example, the list of identification codes may be installed or updated in the computer 102 using a floppy disk, a CD-ROM, a network connection, or other appropriate device.

If the speakers 116, 118 are determined to not be compatible with the audio system 100 or equalization circuit 108 the user may be alerted. It is contemplated that a variety of methods may be implemented to notify the user that the attached speakers 116, 118 are not supported by the audio system 100. In one embodiment, the operating system of the computer 102 opens a message window (not shown) alerting the user that a problem may exist with the compatibility between the speaker or speakers 116, 118 and the audio system 100. Alternatively, it is contemplated that the audio system 100 may employ other methods (e.g., LED, LCD, audio alert, etc.) to notify the user that a problem may exist with the compatibility between the speaker or speakers 116, 118 and the audio system 100.

In addition to alerting the user of potential compatibility problems, the audio system 100 may communicate a variety of messages to the user based on the data stored in the memory block 122 of the speakers 116, 118. For example, the audio system 100 may notify the user as to which speakers 116, 118 are connected to the audio system 100 and working properly.

Figure 3:
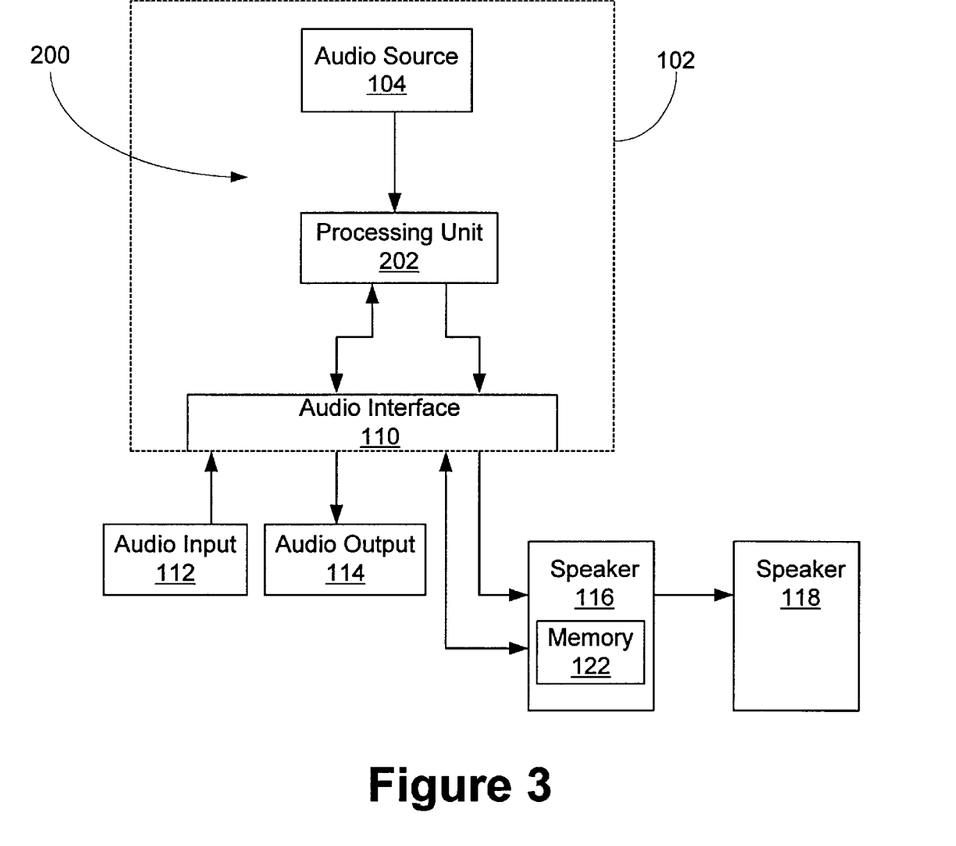
FIG. 3 is a block diagram of a computer audio system illustrating a second embodiment of the present invention.

FIG. 3 illustrates a block diagram of an audio system 200. As before, in one embodiment, the audio system 200 is a computer 102. The audio system 200 may include an audio source 104, a processing unit 202, and an audio interface 110, which interfaces the computer 102 with an audio input 112, an audio output 114, and a first and second speaker 116, 118.

Figure 4:
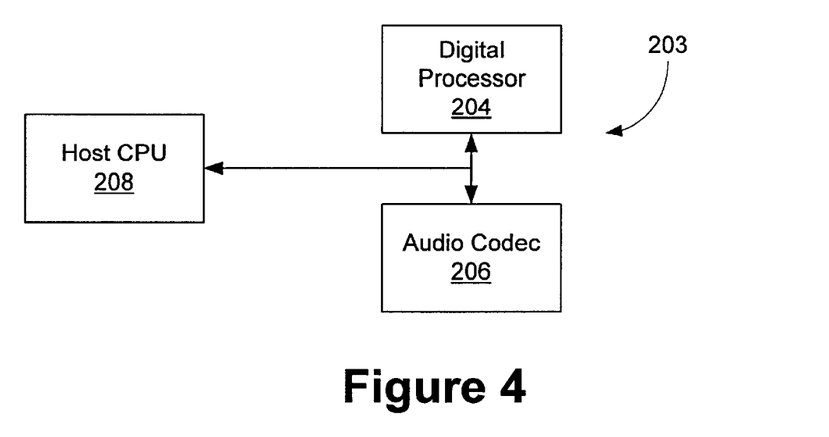
FIG. 4 is a block diagram of the processing unit of FIG. 3.

The audio system 200 includes adjustable equalization that may be integrated into the processing unit 202. Those skilled in the art will appreciate that the processing unit 202 may have many different embodiments depending upon the application and that the processing unit 202 may include processing logic, an A/D converter, a D/A converter, a codec, and other components. FIG. 4 shows one particular embodiment of the processing unit 202.

In FIG. 4, the processing unit 202 is shown as a two-chip architecture 203 that includes a digital processor 204 and a codec 206. A host CPU 208 (e.g., the microprocessor of the computer 102) may be coupled between the digital processor 204 and the codec 206. Those skilled in the art will appreciate that the digital processor 204 may be as simple as a few registers coupled to the host CPU 208 with the host CPU 208 performing most of the audio data processing. Those skilled in the art will appreciate that the host CPU 208 may be the digital processor 204. Alternatively, the digital processor 204 may be at least one separate chip that is capable of processing the audio data on its own or delegating some tasks to the host CPU 208. For example, the digital processor 204 may be a microprocessor, a digital signal processor, a microcontroller, or any other chip adapted to manipulate digital data. The digital processor 204 may receive audio data from the audio source 104 or the audio input 112. The audio source 104 may include devices such as a CD-ROM, sound files, or any other source that produces audio data.

The codec 206 receives the digital data from the digital processor 204 and outputs the digital data in an analog stereo pair. The codec 206 may include a D/A converter, an A/D converter, and other components. Those skilled in the art will appreciate that the codec 206 may be integrated on the same chip as the digital processor 204 depending upon the application.

Referring again to FIG. 3, the first speaker 116 is shown with a memory block 122. Although the memory block 122 is only shown for the first speaker 116, it is contemplated that any number of attached speakers 116, 118 may contain a separate memory block 122 and that the location, number, and type of memory blocks 122 may be varied depending upon the application. The memory block 122 may be any of the nonvolatile memory devices discussed previously for the audio system 100 illustrated in FIG. 2. In addition, the memory block 122 shown in FIG. 3 may be coupled to the audio interface 110 in a similar manner as discussed above for the audio system 100 illustrated in FIG. 2 (e.g., single wire, IIC, etc.).

During system initialization, the audio system 200 queries the first speaker 116 and reads the data stored in the memory block 122. The audio system 200 may read the data using the methods discussed above for the audio system 100 illustrated in FIG. 2. It is contemplated that the type and quantity of information stored in the memory block 122 may vary depending upon the application. In one embodiment, the memory block 122 stores an identification code that may be used to identify the speakers 116, 118.

The identification code may be matched with a predefined equalization curve stored by the computer 102. The equalization curves may contain a variety of data that may be used to determine the equalization response that maximizes the performance of the speakers 116, 118. For example, the data may include coefficients for DSP based equalization, frequency response characteristics, impedance characteristics, or any other equalization parameter that may be used to determine the optimal equalization for the speakers 116, 118.

The equalization curve may be utilized in conjunction with the processing unit 202 to modify the audio signal in a manner that optimizes the sound quality and performance of the speakers 116, 118. It is contemplated that an equalization curve for the speakers 116, 118 may be pre-installed in the computer 102 (e.g., by the manufacturer of the audio system 200) or may be installed or updated by the user. For example, the equalization curve may be installed or updated in the computer 102 using a floppy disk, a CD-ROM, a network connection, or other appropriate device. It is contemplated that a multitude of equalization curves may be maintained in a data file and updated in the computer 102, which allows the audio system 200 to be utilized with and adaptable to a variety of speaker characteristics.

It is contemplated that different methods may be used to match the identification code read from the memory block 122 with a particular equalization curve. In one embodiment, the identification code may be used as an index into a database file, which stores the equalization curves for a number of supported speakers 116, 118. The host CPU 208 makes the equalization curves available in a table that provides a correspondence between the identification code read from the memory block 122 and the available equalization curves. During system initialization, the digital processor 204 obtains the appropriate equalization curve from the host CPU 208 based on the identification code read from the memory block 122. From the equalization curve, the digital processor 204 or the host CPU 208 may digitally implement the equalization for the attached speakers 116, 118. It is contemplated that the audio system 200 may select and implement the appropriate equalization in a manner that is transparent to the user; that is, the system is automated requiring no user input. Alternatively, it may be necessary to alert the user if the audio system 200 is unable to recognize the identification code read from the memory block 122 or if the connected speakers 116, 118 are not supported by the audio system 200.

It is contemplated that various information may be stored in the memory block 122 and that the data type and quantity will vary depending upon the application. In one embodiment, the equalization data of the speakers 116, 118 is stored in the memory block 122 located in the first speaker 116. As stated before, the equalization data of the speakers 116, 118 may include, frequency response, impedance, DSP coefficients, or any other equalization characteristic. During system initialization, the audio system 200 queries the memory block 122, and the equalization data is read by the processing unit 202. In this embodiment, it is not necessary to maintain and update a table of equalization curves because the equalization parameters are stored in the memory block 122 of the first speaker 116 and are read when the audio system 200 is initialized. Alternatively, an interrupt generated by the speakers 116, 118 may alert the audio system 200 to read the data stored in the memory block 122. Using the equalization data read from the memory block 122, the digital processor 204 or the host CPU 208 may digitally implement the equalization for the speakers 116, 118. It is contemplated that the audio system 200 may read the equalization from the memory block 122 and implement the equalization in a manner that is transparent to the user; that is, user input is not required.

Figure 5:
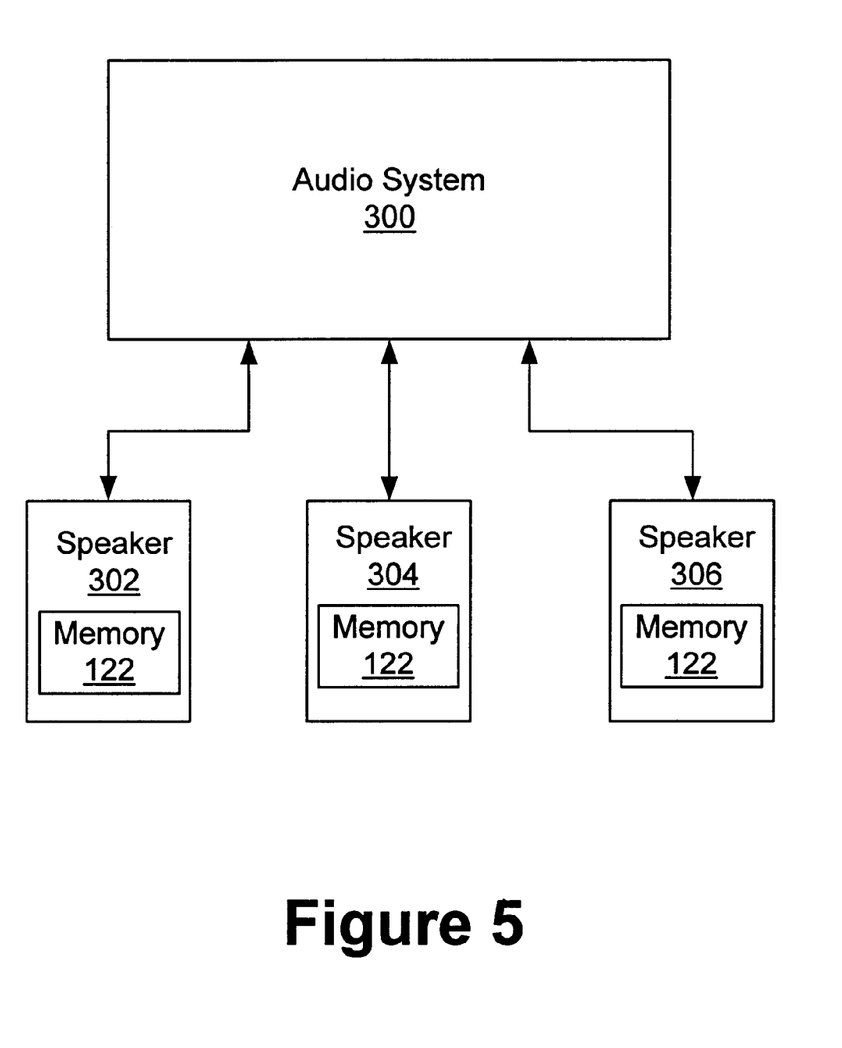
FIG. 5 is a block diagram of a computer audio system illustrating a third embodiment of the present invention.

FIG. 5 illustrates an audio system 300 adapted to simultaneously interface with multiple types of speakers 302, 304, 306 (e.g., subwoofer, midrange, etc.) with each speaker 302, 304, 306 requiring different equalization. It is contemplated that each speaker 302, 304, 306 may contain a memory block 122 that stores an identification code and/or equalization data. During system initialization or after an interrupt, the audio system 300 may query the memory block 122 of each speaker 302, 304, 306 to read the identification code and/or the equalization data. Using the equalization data and/or identification code read from each memory block 122, the audio system 300 may simultaneously implement the particular equalization for each speaker 302, 304, 306. It is contemplated that the audio system 300 may automatically select and implement the equalization in a manner that is transparent to the user.

In addition, the memory block 122 for each speaker 302, 304, 306 may contain data indicating that the speaker 302, 304, 306 is optimized for a specific audio channel. For example, the speakers 302, 304, 306 may be optimized to operate as a right rear speaker, a left rear speaker, a right front speaker, a center channel speaker, etc. By reading the optimal audio channel from the memory block 122 of each speaker 302, 304, 306, the audio system 300 may automatically route the audio signal for each channel to the appropriate speaker 302, 304, 306. For example, the speakers 302, 304, 306 may be randomly coupled to the audio system 300, and based on the audio channel data stored in the memory block 122 of each speaker 302, 304, 306, the audio system 300 may route the appropriate audio signal (e.g., right rear, left rear, center channel, etc.) to the correct speaker 302, 304, 306 regardless of how the speakers are connected to the audio system 300. It is contemplated that the audio system 300 may automatically select and route the appropriate audio channels in a manner that is transparent to the user.

Figure 6:
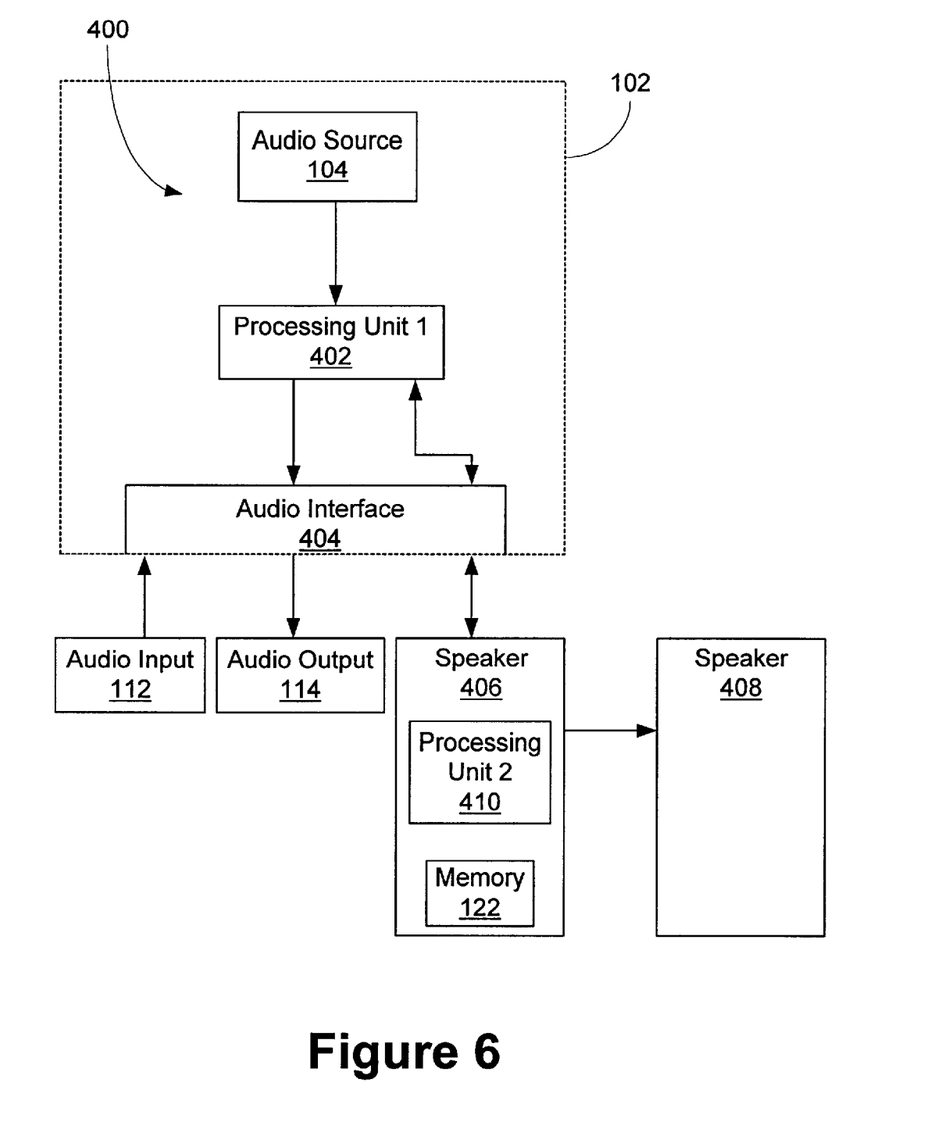
FIG. 6 is a block diagram of a computer audio system illustrating a fourth embodiment of the present invention.

FIG. 6 illustrates a block diagram of an audio system 400. As before, in one embodiment, the audio system 400 is a computer 102. The audio system 400 may include an audio source 104, a first processing unit 402, and an audio interface 404, which interfaces the computer 102 with an audio input 112, an audio output 114, and a first and second speaker 406, 408.

The first speaker 406 is shown with a memory block 122. Although the memory block 122 is only shown for the first speaker 406, it is contemplated that each speaker 406, 408 may contain a separate memory block 122 and that the location, number, and type of memory blocks 122 may be varied depending upon the application. The memory block 122 may be any of the nonvolatile memory devices discussed above for the audio system 100 illustrated in FIG. 2.

The first and second speakers 406, 408 may receive audio data digitally from the audio system 400 via the audio interface 404. It is contemplated that a variety of devices or methods may be utilized to interface the first and second speakers 406, 408 with the audio system 400 and that the interface chosen may depend on a variety of factors, such as, cost, or complexity of the audio system 400. For example, the attached speakers 406, 408 may be coupled to the audio interface 404 using any of a number of standard industry buses such as USB (universal serial bus), IEEE 1394, or any other appropriate bus. Alternatively, it is contemplated that the audio interface 404 may include a wireless communication link. For example, the memory block 122 may communicate with the audio system 400 using infrared (IR), radio frequency (RF), or any other wireless communication protocol.

The memory block 122 may store a unique identification code and/or equalization data. During system initialization or after an interrupt, the audio system 400 may query the memory block 122, and the processing unit 402 may read the data stored in the memory block 122.

The first speaker 406 is shown with a second processing unit 410. Those skilled in the art will appreciate that the second processing unit 410 may have many different embodiments depending upon the application and that the second processing unit 410 may perform a variety of functions, such as processing the digital audio data into its equivalent analog signal. In one embodiment, the second processing unit 410 includes a D/A converter, an amplifier, an equalization circuit, and other components. Alternatively, the equalization may be performed digitally in the first processing unit 402 prior to sending the digital data to the speakers 406, 408. The equalization performed in the first processing unit 402 may be determined by the data read from the memory block 122 during system initialization. As in the previously described embodiments, it is contemplated that the audio system 400 may read the data in the memory block 122 and implement the appropriate equalization in a manner that is transparent to the user.

It is contemplated that the audio system 400 may perform other types of operations based on the data read from the memory block 122. In one embodiment, the second processing unit performs the equalization, but prior to being sent to the speakers 406, 408, the digital audio data stream is modified by the first processing unit 402. It is contemplated that the first processing unit 402 may provide a variety of functions. For example, the first processing unit 402 may filter out digital audio data that is determined to reside outside of the equalization band of the second processing unit 410. In addition the first processing unit 402 may resample the audio data received from the audio source 104 to match the protocol required by the speakers 406 and 408.

Figure 7:
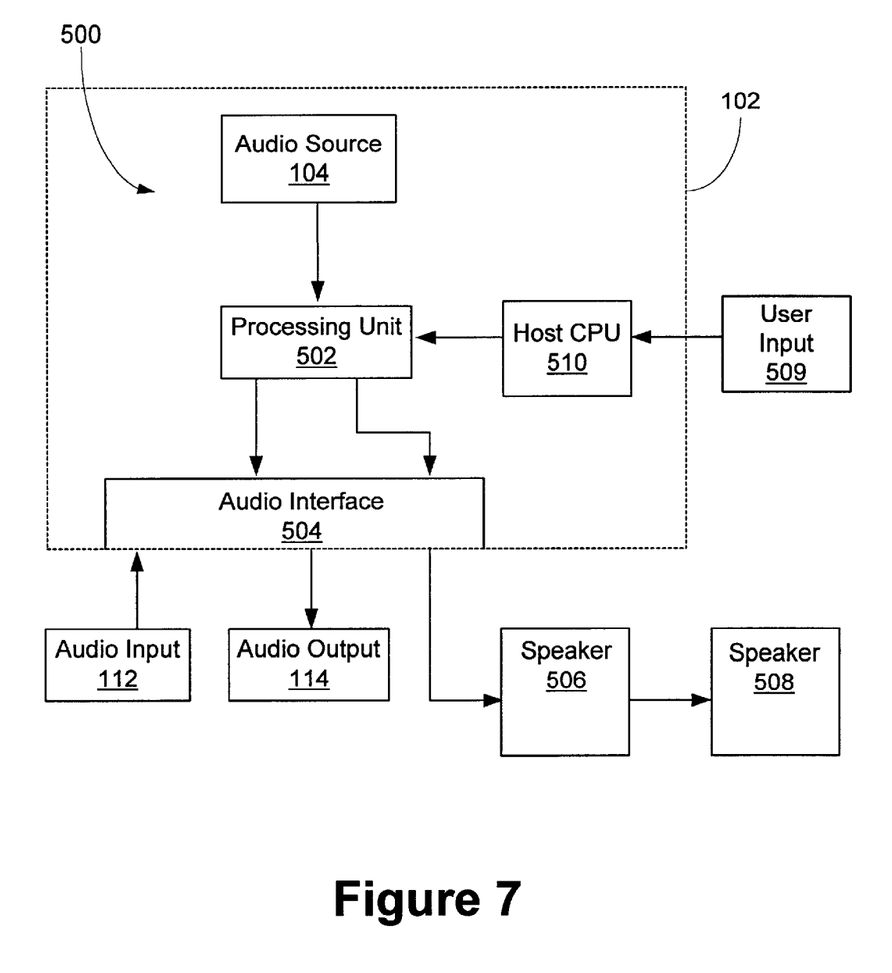
FIG. 7 is a block diagram of a computer audio system illustrating a fifth embodiment of the present invention.

FIG. 7 illustrates a block diagram of an audio system 500. As before, in one embodiment, the audio system 500 is a computer 102. The audio system 500 may include an audio source 104, a processing unit 502, and an audio interface 504, which interfaces the computer 102 with an audio input 112, an audio output 114, and a first and second speaker 506, 508.

It is contemplated that the equalization may be determined by user input 509. For example, the user may select from a group of predefined equalization curves stored by the computer 102. As was described in FIG. 3, the equalization curves may be pre-installed in the audio system 500 or may be installed and updated by the user by way of, for example, CD-ROM, floppy disk, or other appropriate device. It is contemplated that a variety of methods may be used to allow the user to communicate with the audio system 500. In one embodiment, the user may interface the audio system 500 via a host CPU 510. The host CPU 510 may communicate with the audio system 500 instructing the processing unit 502 to adjust the equalization according to the user input. In one embodiment, the user may generate a parametric equalization curve to suit their particular preference. It is contemplated that the user defined equalization curve may be combined with the predefined equalization of the speaker such that the resulting speaker response meets the user's expectations. Furthermore, the host CPU 510 may work in conjunction with the processing unit 502 in performing the equalization. Alternatively, the host CPU 510 may perform the equalization rather than relying on the processing unit 502.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A speaker, comprising:
   at least one transducer adapted to receive an audio signal; and
   at least one memory device adapted to store data;
   wherein the data is associated with an identity of the speaker and is adapted to be used by a host system to display a message based on the identity of the speakers and wherein the data includes an identification code that is adapted to be used by the host system to compare with a list of updatable identification codes to determine if the speaker is compatible with the host system.

2. The speaker of claim 1, wherein the data includes at least one equalization parameter.

3. The speaker of claim 1, further comprising an interface adapted to couple the transducer and the memory device to the audio system.

4. The speaker of claim 3, wherein the interface is adapted to receive the audio signal from the audio system and to transport data between the memory device and the audio system.

5. The speaker of claim 3, wherein the interface comprises at least one signal wire, the signal wire being adapted to transport the audio signal between the audio system and the transducer and to transport data between the memory device and the audio system, wherein the data is used by the audio system to generate a visual alert when the speaker is not compatible with the audio system.

6. The speaker of claim 3, wherein the interface includes a wireless communication link.

7. The speaker of claim 3, wherein the audio system includes a computer.

8. The speaker of claim 3, wherein the interface includes at least one of a universal serial bus, an IEEE 1394 bus, an IIC bus, and a single wire bus.

9. The speaker of claim 1, wherein the memory device includes at least one of a ROM, a PROM, an EPROM, and a EEPROM.

10. The speaker of claim 1, wherein the memory device is adapted to communicate with an audio system such that a visible message regarding the compatibility of the speaker with the audio system is provided to a user.

11. The system of claim 1 wherein the generated electrical signal opens a message window to indicate compatibility of the speaker with the audio system.

12. The system of claim 1 wherein the generated electrical signal causes the audio system to employ a light emitting diode (LED) to indicate compatibility of the speaker with the audio system.

13. The system of claim 1 wherein the generated electrical signal causes the audio system to employ a liquid crystal display (LCD) to indicate compatibility of the speaker with the audio system.

14. The system of claim 1 wherein the generated electrical signal causes the audio system to employ an audio alert to indicate compatibility of the speaker with the audio system.

15. The system of claim 1 wherein the processor reads the data stored in the memory device during initialization of the audio system.

16. A speaker, comprising:
    at least one transducer adapted to receive an audio signal; and
    at least one memory device adapted to store data related to the speaker;
    wherein said memory device is adapted to be used by an audio system to generate an electrical signal that is indicative of compatibility of the speaker with the audio system; and
    wherein the data includes an identification code that is adapted to be used by the audio system to compare with a list of updatable identification codes to determine if the speaker is compatible with the audio system.

17. The speaker of claim 16 further comprising an interface adapted to couple the transducer and the memory device to the audio system.

18. The speaker of claim 17 wherein the interface is adapted to receive the audio signal from the audio system and to transport data between the memory device and the audio system.

19. The speaker of claim 18 wherein the interface comprises at least one of a universal serial bus, an IEEE 1394 bus, an IIC bus, and a single wire bus.

20. The speaker of claim 16 wherein the electrical signal is configured to provide a visual notification that is indicative of compatibility of the speaker with the audio system.

21. The speaker of claim 16 wherein the electrical signal is configured to provide an audible sound that is indicative of compatibility of the speaker with the audio system.

22. The speaker of claim 16 wherein the audio system a computer.

23. An audio system, comprising:
    an audio source;
    a processing unit coupled to the audio source;
    at least one speaker having at least one memory device, the memory device being adapted to store identifier data associated with the speaker, wherein the processing unit is operable to compare the identifier data with a list of updatable stored identifiers and cause a message to be displayed if the identifier data does not match a stored identifier; and
    an audio interface coupled between the processing unit and the speaker.

24. The audio system of claim 23, wherein the data includes an identification code.

25. The audio system of claim 23, wherein the data includes at least one equalization parameter.

26. The audio system of claim 23, further comprising an equalization circuit coupled between the processing unit and the audio interface.

27. The audio system of claim 26, wherein the processing unit is adapted to determine the compatibility between the equalization circuit and the speaker based on the data stored in the memory device.

28. The audio system of claim 23, wherein the audio interface is adapted to transport an audio signal to the speaker and to transport data between the memory device and the processing unit.

29. The audio system of claim 23, wherein the audio interface comprises at least one signal wire coupled to the speaker, the signal wire being adapted to transport the audio signal to the speaker and to transport data between the memory device and the processing unit.

30. The audio system of claim 23, wherein the audio interface includes a wireless communication link.

31. The audio system of claim 23, wherein the memory device includes at least one of a ROM, a FROM, an EPROM, and a EEPROM.

32. The audio system of claim 23, wherein the processing unit is adapted to read data from the memory device and provide adjustable equalization that is determined by the data read from the memory device.

33. The audio system of claim 23, wherein the audio interface includes at least one of a universal serial bus, an IEEE 1394 bus, an IIC bus, and a single wire bus.

34. The audio system of claim 23, wherein the processing unit comprises a digital processor that provides adjustable equalization that is determined by the data stored in the memory device.

35. The audio system of claim 23, wherein the processing unit determines an audio channel for the speaker based on the data stored in the memory device.

36. The audio system of claim 23, wherein the processing unit generates messages related to the data stored in the memory device.

37. An audio system, comprising:
an audio source;
a processing unit coupled to the audio source, the processing unit being adapted to read data from a memory device of a speaker, wherein the data identifies a type of the speaker to the audio system and permits the audio system to display a message based on the type of the speaker, wherein the data includes an identification code that is adapted to be used by the host system to compare with a list of updatable identification codes to determine if the speaker is compatible with the host system; and
an audio interface coupled to the processing unit.

38. The audio system of claim 37, further comprising an equalization circuit coupled between the processing unit and the audio interface.

39. The audio system of claim 38, wherein the processing unit is adapted to determine the compatibility between the equalization circuit and the speaker based on the data stored in the memory device.

40. The audio system of claim 37, wherein the processing unit provides adjustable equalization that is determined by data stored in the memory device of the speaker.

41. The audio system of claim 37, wherein the processing unit determines an audio channel for the speaker based on the data stored in the memory device.

42. The audio system of claim 37, wherein the processing unit includes at least one of a microprocessor, a digital signal processor, and microcontroller.

43. The audio system of claim 37, wherein the audio interface includes at least one of a universal serial bus, an IEEE 1394 bus, an IIC bus, and a single wire bus.

44. The audio system of claim 37, wherein the audio interface includes a wireless communication link.

45. The audio system of claim 37, wherein the audio interface comprises at least one signal wire coupled to the speaker, the signal wire being adapted to transport an audio signal to the speaker and to transport data between the memory device and the processing unit.

46. The audio system of claim 37, wherein the processing unit generates messages related to the data stored in the memory device.

47. The system of claim 37 wherein the data identifies the speaker to the audio system by identifying a manufacturer and a model number of the speaker.

48. A method, comprising:
reading speaker identification data from a memory device of at least one speaker;
comparing the speaker identification data with a list of updatable identification data stored in an audio system; and
if the speaker identification data does not match identification data stored in the audio system, generating an electrical signal configured to notify a user via at least one of a visual communication and an audible communication that the speakers are incompatible with the audio system.

49. The method of claim 48, wherein reading the data from the memory device comprises reading at least one of an identification code and an equalization parameter.

50. The method of claim 48, further comprising determining equalization for the audio signal based on the data read from the memory device of the speaker.

51. The method of claim 48, wherein determining the equalization of the audio signal comprises matching an identification code read from the memory device of the speaker with equalization data stored in the audio system.

52. The method of claim 48, wherein determining the equalization of the audio signal comprises determining the equalization based on an equalization parameter stored in the memory device of the speaker.

53. The method of claim 48, further comprising determining an audio channel for the speaker based on the data read from the memory device of the speaker.

54. The method of claim 48, further comprising determining compatibility between an equalization circuit and the speaker based on the data read from the memory device of the speaker.

55. The method of claim 48, wherein reading the data from the memory device of the speaker comprises reading the data using a wireless communication link.

56. The method of claim 48, wherein reading the data comprises reading data from at least one of a ROM, a PROM, an EPROM, a EEPROM.

57. The method of claim 48, wherein reading the data from the memory device of the speaker comprises reading the data using one of a universal serial bus, an IEEE 1394 bus, an IIC bus, and a single wire bus.

58. The method of claim 48, wherein reading the data from the memory device of the speaker comprises using at least one signal wire, the signal wire being adapted to transport the audio signal to the speaker and to transport data from the memory device of the speaker.

59. The method of claim 48, further comprising generating messages related to the data read from the memory device of the speaker.

\* \* \* \* \*

UNITED STATES PATENT AND TRADEMARK OFFICE
CERTIFICATE OF CORRECTION

PATENT NO. : 6,859,538 B1
APPLICATION NO. : 09/271050
DATED : February 22, 2005
INVENTOR(S) : Christopher Voltz Page 1 of 1

It is certified that error appears in the above-identified patent and that said Letters Patent is hereby corrected as shown below:

IN THE CLAIMS

Claim 1, Column 9, line 40, delete "speakers" and insert therefor --speaker--

Claim 22, Column 10, line 53, after "system" insert --is--

Claim 31, Column 11, line 22, delete "FROM" and insert therefor --PROM--

Signed and Sealed this

Ninth Day of September, 2008

JON W. DUDAS
*Director of the United States Patent and Trademark Office*